United States Patent
Le Roy

[11] Patent Number: 5,822,363
[45] Date of Patent: Oct. 13, 1998

[54] TRANSMISSION PROCESS HAVING SPECTRUM SPREAD PHASE DIFFERENTIAL MODULATION ADN DEMODULATION USING ORTHOGONAL PSEUDORANDOM SEQUENCES

[75] Inventor: Alain Le Roy, Meylan, France

[73] Assignee: Commissariat A L'Energie Atomique, Paris, France

[21] Appl. No.: 560,211

[22] Filed: Nov. 21, 1995

[30] Foreign Application Priority Data

Dec. 19, 1994 [FR] France .................................. 94 15241

[51] Int. Cl.$^6$ ....................................................... H04K 1/00
[52] U.S. Cl. ........................................... 375/206; 375/207
[58] Field of Search ..................................... 375/208, 207, 375/206, 343, 279, 283, 280, 329, 330, 331; 370/208, 203; 364/717; 322/164; 332/106; 329/304

[56] References Cited

U.S. PATENT DOCUMENTS

| | | | |
|---|---|---|---|
| 4,253,067 | 2/1981 | Caples et al. ............................ | 375/330 |
| 4,443,799 | 4/1984 | Rubin ....................................... | 375/207 |
| 4,730,340 | 3/1988 | Frazier, Jr. ............................... | 375/207 |
| 5,157,686 | 10/1992 | Omura et al. ............................ | 375/208 |
| 5,237,587 | 8/1993 | Schoolcraft ............................. | 375/208 |
| 5,309,474 | 5/1994 | Ghilhousen et al. ................... | 375/208 |
| 5,353,301 | 10/1994 | Mitzlaff . | |
| 5,583,884 | 12/1996 | Maruyama et al. ..................... | 375/207 |
| 5,592,506 | 1/1997 | Omura et al. ............................ | 375/207 |

FOREIGN PATENT DOCUMENTS 2233860   1/1991   United Kingdom .
92/00639  1/1992   WIPO .

*Primary Examiner*—Tesfaldet Bocure
*Attorney, Agent, or Firm*—Pearne, Gordon, McCoy & Granger LLP

[57] ABSTRACT

Transmission process having spectrum spread phase differential modulation and demodulation using orthogonal pseudorandom sequences. Use is made of two orthogonal pseudorandom sequences ($C_{E1}$, $C_{E2}$) for spreading the spectrum of the symbols ($d_k$) to be transmitted and detection takes place of the phase difference between the received signals filtered by filters matched to the two sequences, one being delayed.

10 Claims, 5 Drawing Sheets

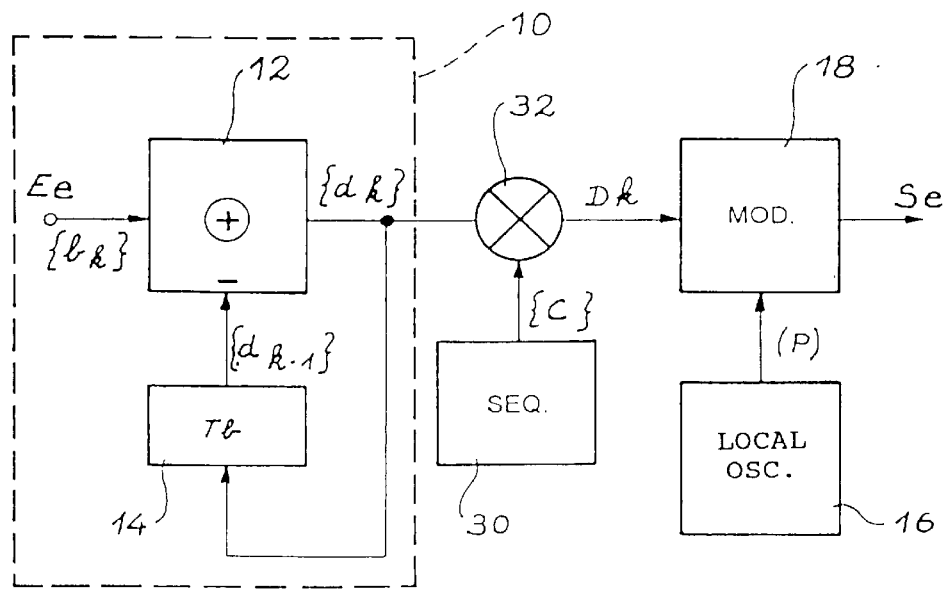
FIG. 3
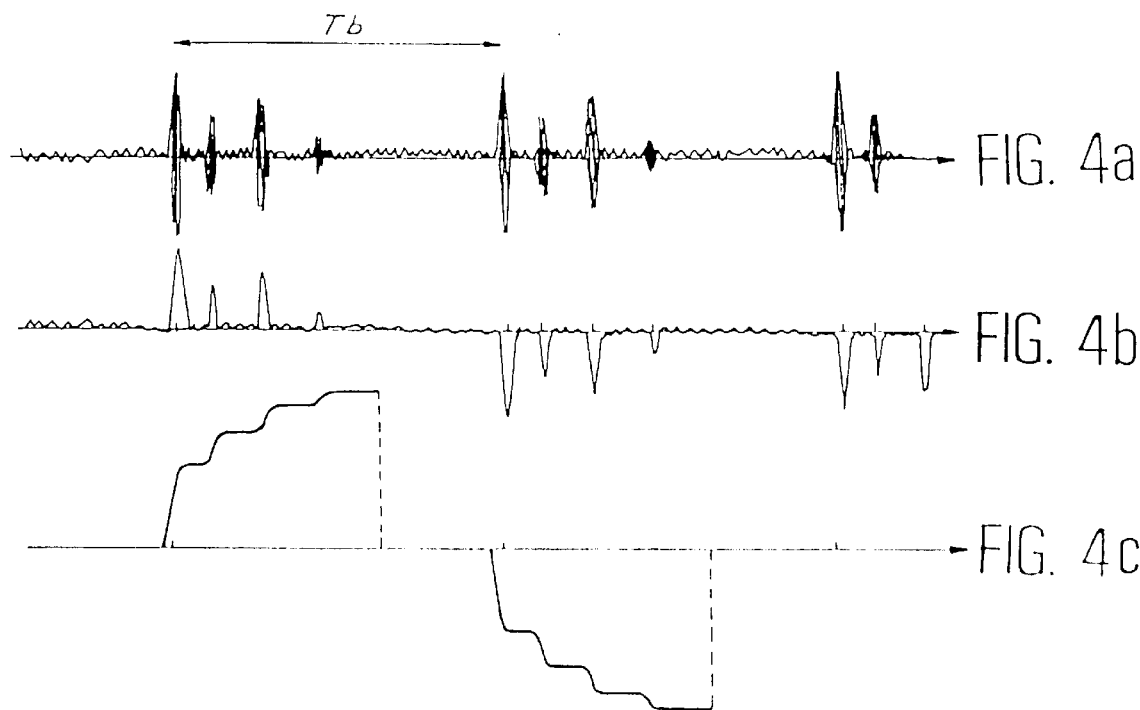
FIG. 4a
FIG. 4b
FIG. 4c

5,822,363

TRANSMISSION PROCESS HAVING SPECTRUM SPREAD PHASE DIFFERENTIAL MODULATION ADN DEMODULATION USING ORTHOGONAL PSEUDORANDOM SEQUENCES

TECHNICAL FIELD

The present invention relates to a transmission process having spectrum spread phase differential modulation and demodulation using orthogonal pseudorandom sequences.

The direct sequence spectrum spread modulation method has already been used for many years, more particularly in radiocommunications with satellites and in the military field. It is also used in radiolocation, such as in the so-called global positioning system or GPS.

This method has numerous advantages:

a) Discretion: This discretion is linked with the spread of the information transmitted over a broad frequency band. This leads to a low spectral density of the transmitted power. This feature makes this method particularly attractive for military applications, which require maximum discretion transmission systems. It is also of interest for civil applications, because it makes it possible to allocate the same frequency band to services using conventional spectrum spread modulation methods.

b) The resistance to scramblers and interference: A spectrum spread receiver effects the correlation operation between the message received and the spread pseudorandom sequence before any demodulation operation. This correlation operation makes it possible to extract the message to be received and rejects any scrambler or interference. The longer the pseudorandom sequence used for spreading the spectrum the greater the resistance to scramblers. This feature is vital in military applications. It is also useful in civil applications, because it is necessary to avoid, apart from interference due to users operating in a narrow band, the broad band interference produced by other spectrum spread transmissions.

c) The excellent behaviour in fading channels: Provided that use is made of an asynchronous receiver structure, this method makes it possible to transmit digital data in reliable manner between mobiles and in the presence of obstacles generating multiple propagation paths. This is the consequence of the diversity effect inherent in the system making it possible to demodulate independently of one another all the informations carried by all the propagation paths. This feature makes it possible to envisage the use of this method for all transmissions between vehicles in an urban environment, or for radio connections within buildings, where fading effects can be produced by the presence of personnel constituting mobile obstacles for radio waves.

d) The possibility of using a multiple access protocol with distribution by codes: This method consists of allocating orthogonal spread pseudorandom sequences (i.e. having low intercorrelation coefficients) to the different users. However, it remains difficult to implement, because it imposes an effective control of the transmission power.

The direct sequence spectrum spread modulation method has been described to a significant extent in the specialized literature. Reference can be made to two works, namely "Spread spectrum communications" by Marvin K. Simon et al, published by Computer Science Press, USA and the second entitled "Spread spectrum systems" by Robert C. Dixon and published by John Wiley and Sons, USA.

PRIOR ART

In a conventional data transmitter using a conventional modulation method, modulation takes place of a radio frequency carrier by phase, frequency or amplitude modulation, or by a mixed modulation. For simplification purposes reference will only be made to phase modulations, which are nowadays the most frequency used. The digital data to be transmitted are binary elements or bits, which have a period $T_b$, i.e. a new bit must be transmitted for every $T_b$. With these bits it is possible to constitute symbols having a period $T_s$. These are symbols which will modulate the radio frequency carrier. The symbol flow rate is expressed in bauds (or symbols/second).

This procedure can be illustrated by two examples:

a) Binary phase shift keying (BPSK), which consists of allocating a phase state, e.g. 0, to the 0 bits and another phase state, e.g. π to the 1 bits. In this case, the symbol is the bit and $T_s=T_b$. The phase state of the radio frequency carrier is imposed for every bit.

b) Quaternary phase shift keying or QPSK consists of using symbols formed by two successive bits. Thus, these symbols can assume four-states (00, 01, 10, 11). A phase state of the carrier is allocated to each of these states and in this case $T_s=2T_b$. Therefore the phase state of the radio frequency carrier is imposed every other bit.

It is possible to improve the transmitted radio signal spectrum and in particular reduce the power in parasitic side lobes by using more sophisticated phase modulations, for which the modulating signal is shaped (filtered) prior to modulation and reference is then made to MSK, GMSK, SRC4 modulations.

On the reception side a distinction can be made between two large demodulation families: coherent demodulation and non-coherent demodulation. The coherent demodulation methods consists of implementing in the receiver a subassembly, whose function is to estimate the average phase of the carrier, so as to reconstitute a phase reference, which is then mixed with the signal received in order to demodulate the data.

This method has the optimum performance characteristics in radio channels, where a Gaussian noise is added to the useful signal. This is e.g. the case with transmissions with satellites. However, in the presence of multiple paths, this method gives very poor results.

The non-coherent demodulation method is based on the observation according to which it is sufficient for the phase reference of the current symbol is the phase of the preceding symbol. In this case, the receiver does not estimate the phase of the symbols, but instead the phase difference between two successive symbols. Thus, there is differential phase shift keying (DPSK) or differential quadrature phase shift keying (DQPSK).

FIG. 1 shows the block diagram of a DPSK transmitter, which has an input Ee, which receives the data $b_k$ to be transmitted, which have a period $T_b$ and it comprises a differential coder 10 formed by a logic circuit 12 and a delay circuit 14, a local oscillator 16 supplying a carrier P and a modulator 18 connected to an output Se supplying the DPSK signal.

The logic circuit 12 receives the binary data $b_k$ and supplies other binary data called symbols and designed $d_k$. The logic circuit 12 also receives the symbols delayed by a period $T_b$, i.e. $d_{k-1}$. The logic operation performed in the circuit 12 is the exclusive-OR operation on the data $b_k$ and on the compliment of $d_k$ delayed by one serial position (i.e. $d_{\overline{k-1}}$), which gives: $d_k = b_k \oplus d_{\overline{k-1}}$.

The modulator 18 phase modulates the carrier P as a function of each symbol $d_k$.

FIG. 2 shows the block diagram of a corresponding receiver of the differential demodulator type. This receiver has an input Er and comprises a band pass filter 20, a delay circuit 22 for a duration Tb, a multiplier 24, an integrator 26 operating on a period Tb and a logic decision circuit 28. The receiver has an output Sr, which restores the data $b_k$.

The pass band of the input filter 20 is between the NYQUIST band equal to $1/T_b$ and the width of the main lobe of the DPSK signal, which is $2/T_b$.

By designating x(t) the signal received applied to the input Er, the multiplier 24 received a filtered signal $x_F(t)$ emanating directly from the filter 20 and a delayed filtered signal $x_{FR}$ emanating from the delay circuit 22. It supplies a product signal m(t), which is integrated on a period $T_b$ in the integrator 26, which supplies a signal, whose polarity makes it possible to determine the value of the transmitted bit, which is decided by the logic 28.

The direct sequence spectrum spreading method consists of multiplying the sequence of symbols $d_k$ obtained after the differential coding by a pseudorandom sequence having a much higher flow rate than that of the data to be transmitted. This pseudorandom sequence has a binary rate N times higher than that of the binary data to be transmitted. The duration $T_c$ of one bit of this pseudorandom sequence, said bit also being called a chip, is therefore equal to $T_b/N$. The chip rate of the pseudorandom sequence can be several megachips, or even several dozen megachips per second.

FIG. 3 shows the block diagram of a direct sequence spectrum spread transmitter. The elements already shown in FIG. 1 carry the same references. In addition to those of FIG. 1, the emitter comprises a pseudorandom (C) sequence generator 30 and a multiplier 32. The signal supplied by the multiplier has a pseudorandom sequence-spread spectrum. The modulator 18 then no longer operates on the symbol of origin $d_k$, but on the corresponding spread symbol $D_k$.

The corresponding receiver has the same structure as that of FIG. 2, except that the filter 20 is now a matched filter, whose pulse response reduced to the baseband is the time-reversed combined complex of the pseudorandom sequence used in the transmitter.

The pseudorandom sequence used on transmission must consequently have an autocorrelation function with a marked peak of value N for a zero delay and the smallest possible side lobes. This can be obtained by using maximum length sequences also known as m-sequences, or so-called GOLD or KASAMI sequences.

The sequences usable in a spectrum spread system have been the subject matter of intense studies, which are summarized in the article entitled "Cross-correlation properties of pseudorandom and related sequences" by Dilip V. SARWATE and Michael B. PURSLEY, published in "Proceedings of the IEEE", vol. 68, No. 5, May 1980, pp 593 to 619.

The input filter used in a spectrum spread receiver has an equivalent baseband pulse response H(t) and this response must be the time-reversed combined complex of the pseudorandom sequence used on transmission:

$$H(t)=c^*(T_s-t)$$

where C(t) is the pseudorandom sequence used on transmission.

Therefore the signal supplied by such a filter is:

$$x_F(t)=x(t)*H(t)$$

where the symbol * designates the convolution operation, so as to give:

$$x_F(t) = \int_{t-T_s}^{t} x(s) \cdot C^*(T_s - t + s) ds.$$

Thus, the matched filter performs the correlation between the signal applied to its input and the pseudorandom spread sequence.

In a Gaussian additive noise channel, the signal $x_F(t)$ will therefore be in the form of a pulse signal, whose repetition frequency is equal to $1/T_b$. The envelope of this signal is the autocorrelation function of the signal C(t). The information is carried by the phase difference between two successive correlation peaks. Thus, the multiplier output will be formed by a succession of positive or negative peaks, as a function of the transmitted bit value.

In the case of a radiotransmission in the presence of multiple paths, the output of the matched filter will be formed by a succession of correlation peaks, each peak corresponding to a propagation path.

The different signals of the reception chain are shown in FIG. 4. The line (a) represents the filtered signal $x_F(t)$, the line (b) the correlation signal $x_F(t)*x_F(T_s-t)$ and the line (c) the signal at the integrator output.

This known procedure is described in detail in the article entitled "Direct-Sequence Spread Spectrum with DPSK Modulation and Diversity for Indoor Wireless Communications" published by Mohsen KAVEHRAD and Bhaskar RAMAMURTHI in "IEEE Transactions on Communications", vol. COM 35, No. 2, February 1987.

Thus, a description has been given of DPSK spectrum spread modulation. It is clear that this procedure can be applied in the same way to all differential modulations. For example, in the case of DQPSK modulation, each correlation peak at the output of the matched filter could assume four phase states, whereas there are only two with a DPSK modulation.

Despite their great interest these procedures suffer from disadvantages. Thus, the successive bits constituting the message to be transmitted are all multiplied by the same pseudorandom spread sequence, which can give rise to a coherent intercorrelation noise able to deteriorate the quality of the signal m(t) at the demodulator output.

The applicant has profoundly studied this question and the research carried out can be summarized as follows. Consideration must again be given to the transmitter shown in FIG. 3 and the receiver of FIG. 2, knowing that the latter operates with a matched filter 20 corresponding to a given pseudorandom sequence. In general terms, the sequence used on reception is designated $C_R$ and that used on transmission $C_E$. When the transmitter and receiver are matched to one another, one obviously obtains $C_E \equiv C_R$.

In baseband, the signal at the input of the matched filter 20 can be written:

$$x(t)=dC_E(t)$$

d representing the sequence of bits modulating the carrier, said bits being obtained from binary data to be transmitted b following passage in the differential coder 10.

The filtered signal found at the output of the matched filter can then be written:

$$x_F t() = \int_{t-T_b}^{t} x(s)C_R^*(s-t+T_b)ds$$

$C_R^*$ representing the combined complex of $C_R$, which can then be written:

$$x_F(t) = d_{-1}\int_{t-T_b}^{0} C_E(s+T_bC_R^*(s-t+T_b)ds + $$

$$do\int_{o}^{t} C_E(s)C_R^*(s-t+T_b)ds$$

or once again $$x(t)=d_{-1}C_{C_E,C_R}(-t)+d_0C_{C_E,C_R}(T_b-t)$$

where the notation $C_{C_E,C_R}$ represents the aperiodic correlation function between $C_E$ and $C_R$.

In the case where $C_E \equiv C_R$ the same formula is obtained by replacing the $C_{C_E,C_R}$ by $C_{C_R}$, which is the aperiodic autocorrelation function of $C_R$.

The delayed filtered signal found at the output of the delay circuit 22 is simply shifted by one symbol and can consequently be written:

$$X_{FR}(t)=d_{-2}C_{C_E,C_R}(-t)+d_{-1}C_{C_E,C_R}(T_b-t).$$

Finally, at the output of the demodulator 24, the signal can be written:

$$m(t)=x_F(t).x_{FR}(t)$$

or $$m(t)=d_{-2}d_{-1}C^2_{C_E,C_R}(-t)+\{d^2_{-1}+d_{-2}d_0\}C_{C_E,C_R}(-t).C_{C_E,C_R}(T_b-t)+d_{-1}d_0C^2_{C_E,C_R}(T_b-t)$$

As the symbols d are obtained from data b by the relation $d_k=b_k \oplus \overline{d_{k-1}}$ and as d or b can only assume the two values +1 or −1, we necessarily obtain:

$$d_{-2}d_{-1}=b_{-1},\ d_{-1}.d_0=b_0$$

and $$d^2_{-1}+d_{-2}.d_0=1+b_{-1}.b_0$$

Thus, one once again obtains a new expression of the demodulation signal m(t):

$$m(t)=b_{-1}C^2_{C_E,C_R}(-t)+\{1+b_0b_{-1}\}C_{C_E,C_R}(-t)C_{C_E,C_R}(T_b-t)+b_0C^2_{C_E,C_R}(T_b-(t)$$

Three cases can then occur as a function of the respective values of $b_0$ and $b_{-1}$.

Case No. 1: $b_0=b_{-1}=1$
We then obtain:

$$m(t)=\{C_{C_E,C_R}(-t)+C_{C_E,C_R}(T_b-t)\}^2=\Theta^2_{C_E,C_R}(T_b-t)$$

in which $\Theta^2_{C_E,C_R}$ is called the even correlation function of $C_E$ and $C_R$.

Case No. 2: $b_{-1}=b_0=-1$ $$m(t)=-\{C_{C_E,C_R}(-t)-C_{C_E,C_R}(T_b-t)\}^2=-\hat{\Theta}^2_{C_E,C_R}(T_{b-t})$$

where $\hat{\Theta}^2_{C_E,C_R}$ is called the odd autocorrelation function of $C_E$ and $C_R$.

Case No. 3: $b_{-1}=-b_0$ $$m(t)=b_0\{C^2_{C_E,C_R}(T_b-t)-C^2_{C_E,C_R}(-t)\}=b_0\Theta_{C_E,C_R}(T_b-t).\hat{\Theta}_{C_E,C_R}(T_b-t)$$

With these considerations developed, the deficiency of the conventional direct sequence spectrum spread method becomes very clear. Thus, at least in the first two cases, the demodulation signal m(t) is either always positive, or always negative. However, it is this signal which will be integrated into the circuit 26 prior to decision taking. Apart from the correlation peak obtained for t=0, this signal should ideally have a zero mean value. This is manifestly not the case and the integrator output will consequently have at the time of decision making, a significant negative or positive shift value as a result of the integration of a signal, whose mean value is not zero. These shifts will deteriorate the quality of the decision taking and will increase the bit error rate and this will become worse as the integration time increases.

The object of the invention is to obviate this disadvantage and aims at improving the quality of the output signal of the demodulator (signal m(t)) and therefore the transmission quality.

DESCRIPTION OF THE INVENTION

The invention therefore proposes a novel transmission process by spectrum spread phase differential modulation and demodulation in which use is made of two pseudorandom sequences on transmission, which are orthogonal to one another, said two sequences being used for spreading the spectrum of the signals, which will then modulate a carrier. On reception, two filtering operations matched to these two orthogonal sequences will take place. In order to obtain the demodulation signal, multiplication will take place of the delayed filtered signal associated with one of the sequences by the filtered, but not delayed signal associated with the other sequence. As these two signals result from filtering operations by filters, whose pulse responses are orthogonal in the NYQUIST sense, the interference affecting these signals will be decorrelated, which will decrease their influence on the demodulation signal. In the prior art, the two signals, respectively delayed and filtered and filtered emanated from the same filter, so that the interference affecting them was correlated.

More specifically, the present invention relates to a data transmission process by spectrum spread phase differential modulation and demodulation, in which the data are organized in at least one binary data sequence having a certain period, characterized in that:
A) on transmission:
  a differential coding of the binary signals to be transmitted takes place in order to obtain symbols, use being made of two orthogonal pseudorandom sequences for spreading the spectrum of each symbol and a carrier is modulated by the spread spectrum symbols,
B) on reception:
  two parallel filtering operations take place matched to the two orthogonal sequences and there is an estimation of the phase difference between the two signals obtained after filtering, one of which has been delayed, which restores the data.

The invention has several embodiments according to which transmission takes place of one, two or more than two data flows.

BRIEF DESCRIPTION OF THE DRAWINGS

FIG. 3, already described, shows the block diagram of a prior art, direct sequence spectrum spread transmitter.

FIG. 4, already described, shows the configuration of the different signals appearing in a direct sequence spectrum spread receiver.

DETAILED DESCRIPTION OF EMBODIMENTS

Figure 5:
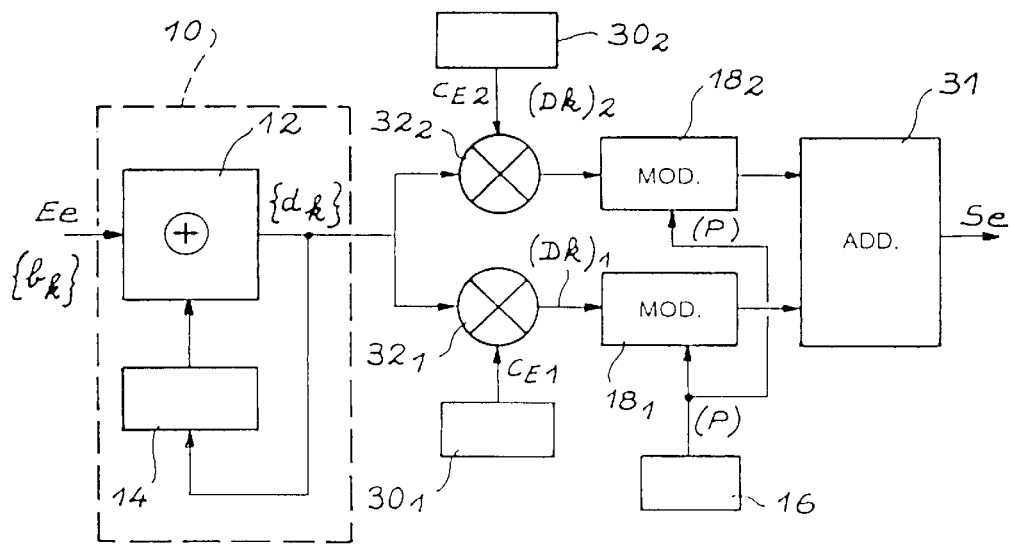
FIG. 5 is a block diagram of a transmitter according to the invention in a first variant with a single flow of data to be transmitted.

FIG. 5 shows a diagram of an embodiment of a transmitter according to the invention. This transmitter comprises the means already shown in FIG. 3 and which carry the same references, namely an input Ee receiving the binary data $b_k$ to be transmitted, said data having a period $T_b$, a differential coder 10 with its logic circuit 12 and its delay circuit 14. This coder supplies the symbols $d_k$. The transmitter shown also comprises a first generator $30_1$ supplying a first pseudorandom sequence $C_{E1}$ applied to a first multiplier $32_1$ and a second generator $30_2$ supplying a second pseudorandom sequence $C_{E2}$ applied to a second multiplier $32_2$. The multipliers $32_1$ and $32_2$ supply symbols $(D_k)_1$ and $(D_k)_2$, whose spectrum is spread by the corresponding sequences. The transmitter also comprises a first modulator $18_1$ receiving a carrier P produced by a local oscillator 16 and the symbols $(D_k)_1$ spread by the first pseudorandom sequence $C_{E1}$ and a second modulator $18_2$ receiving said same carrier P and the symbols $(D_k)2$ spread by the second pseudorandom sequence $C_{E2}$. Finally, an adder 31 is connected to the two modulators $18_1$ and $18_2$ and supplies the output Se of the transmitter. This output transmits the carrier modulated by the doubly spread signal. The modulation can be of a random nature (phase, frequency, mixed, etc.).

Naturally, it would be possible to modify this circuit by firstly adding the two spread signals $(D_k)_1$ and $(D_k)_2$ and by using a single modulator. It would also be possible to add the two pseudorandom sequences $C_{E1}$ and $C_{E2}$ as soon as they are formed and to spread the signal with the aid of the pseudorandom sum obtained.

Figure 1:
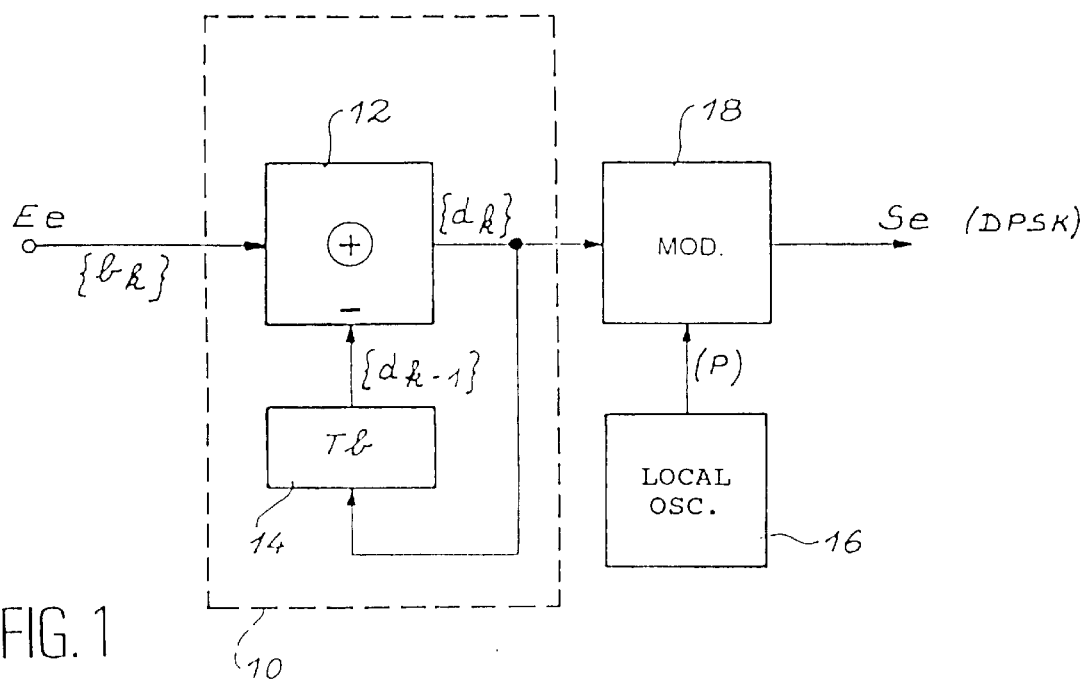
FIG. 1, already described, shows the block diagram of a prior art, differential coding transmitter.
Figure 2:
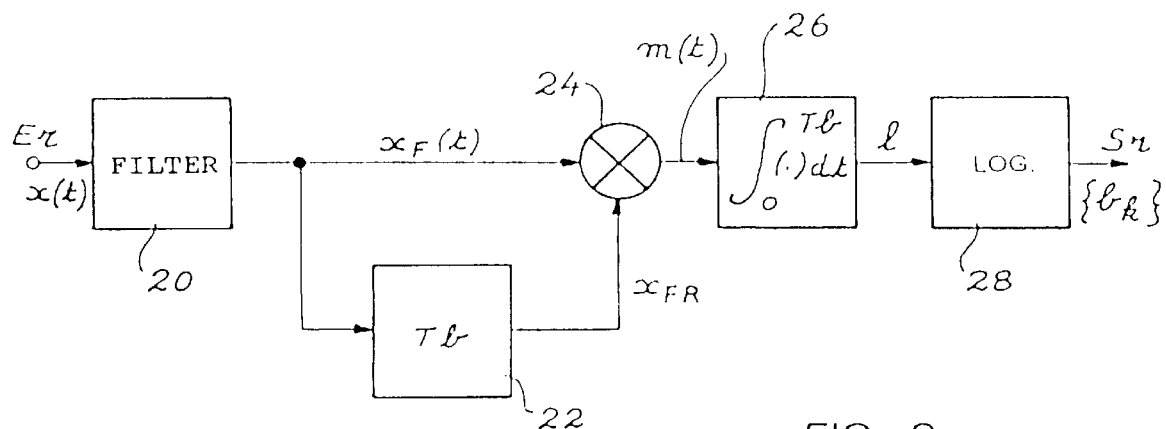
FIG. 2, already described, shows the block diagram of a corresponding receiver.
Figure 6:
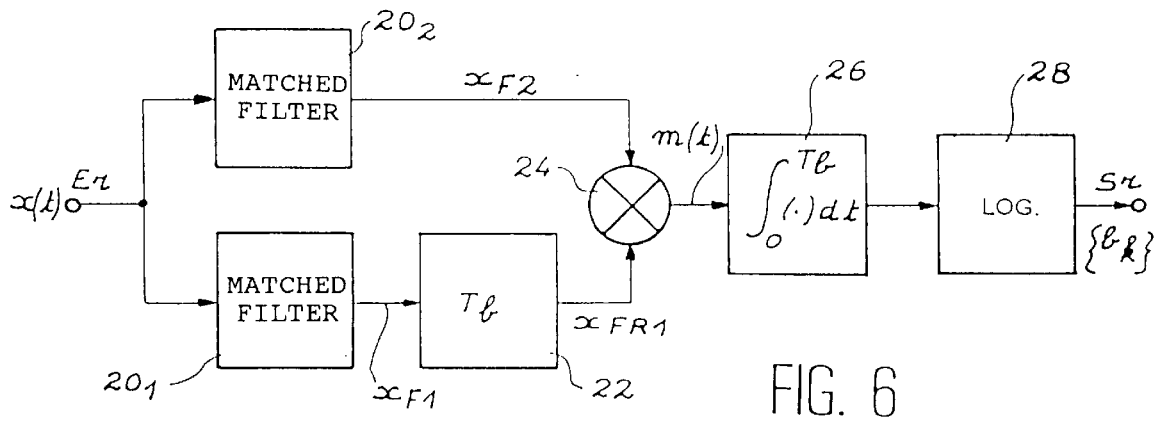
FIG. 6 is a block diagram of a corresponding receiver.

The receiver shown in FIG. 6 comprises the means already shown in FIG. 2, namely an input Er receiving a signal x(t), a delay circuit 22 with a duration equal to the period $T_b$ of the transmitted bits, a multiplier 24 supplying a demodulation signal m(t), an integrating circuit 26 acting on the signal m(t) supplied by the multiplier 24, the integration taking place between 0 and $T_b$, a logic decision circuit 28 and a general output Sr supplying the original digital data $b_k$. This receiver differs from the prior art in that it comprises a first filter $20_1$ matched to the first pseudorandom sequence $C_{E1}$ used in the transmitter and a second filter $20_2$ matched to the second pseudorandom sequence $C_{E2}$ used in the transmitter. The term filter matched to a pseudorandom sequence is understood to mean a filter, whose pulse response brought down to the baseband is the time-reversed combined complex of the pseudorandom sequence in question.

The first filter $20_1$ supplies a filtered signal $x_{F1}$, which is then delayed by $T_b$ in a circuit 22 in order to give a delayed, filtered signal $x_{FR1}$. The second filter $20_2$ supplies a filtered signal $x_{F2}$. This signal is not delayed and is used for producing the demodulation signal m(t) by multiplication with the filtered, delayed signal $x_{FR1}$.

This transmitter-receiver assembly functions as follows. As in the case of conventional modulation with direct sequence spectrum spreading, the binary quantities used for modulating the carrier are the symbols $d_k$ obtained from the original data $b_k$ following passage in the differential coder 10. In the conventional process, the symbols $d_k$ are multiplied by a single pseudorandom sequence $C_E$. In the process according to the invention, the symbols $d_k$ are multiplied by the two pseudorandom sequences $C_{E1}$ and $C_{E2}$, which are orthogonal to one another, in order to form a signal which will modulate the carrier.

The sequences $C_{E1}$ and $C_{E2}$ can have the same general characteristics as a sequence used in the prior art. They are both constituted by N elements or chips having a period $T_c = T_b/N$ and their autocorrelation functions have a single marked peak for a zero delay. They have the lowest possible value elsewhere. These sequences are also chosen so as to have a low intercorrelation function, no matter what the time.

In the case of the receiver, the input signal x(t) can be written:

$$x(t) = d(C_{E1}(t) + C_{E2}(t))$$

The filtered, delayed signal $x_{FR1}$ at the output of the delay circuit 22 can be written:

$$x_{FR1} = d_{-2}\{C_{CE1,CE1}(-t) + C_{CE2,CE1}(-t)\} + d_{-1}\{C_{CE1,CE1}(T_b-t) + C_{CE2,CE1}(T_b-t)\}$$

In the same way, the filtered signal $X_{F2}$ at the output of the filter $20_2$ can be written:

$$x_{F2} = d_{-1}\{C_{CE1,CE2}(-t) + C_{CE2,CE2}(-t)\} + d_0\{C_{CE1,CE2}(T_b-t) + C_{CE2,CE2}(T_b-t)\}$$

At the output of the multiplier 24, the demodulation signal is of form:

$$m(t) = x_{FR1} \cdot x_{F2}$$

Therefore four cases can be distinguished:

Case No. 1: $b_0 = b_{-1} = 1$

We then have $d_{-2} = d_{-1} = d_0$. It is then possible to rewrite $x_{FR1}$ and $X_{F2}$ in the following form:

$$x_{FR1} = d_{-1}\{\Theta_{CE1}(T_b-t) + \Theta_{CE2,CE1}(T_b-t)\}$$

and $$x_{F2} = d_{-1}\{\Theta_{CE1,CE2}(T_b-t) + \Theta_{CE2}(T_b-t)\}$$

where, after simplification and replacing $\Theta_{CEi,CEj}(T_B-t)$ with $\Theta_{ij}$ $m(t) = \hat{\Theta}_{11} \cdot \hat{\Theta}_{12} + \hat{\Theta}_{11} \cdot \hat{\Theta}_{22} + \hat{\Theta}_{21} \cdot \hat{\Theta}_{12} + \hat{\Theta}_{21} \cdot \hat{\Theta}_{22}$ For $t=T_b$, we clearly obtained $m(0)=\hat{\Theta}_{11}(0)\cdot\hat{\Theta}_{22}(0)+\ldots$ i.e. $N^2$, which corresponds to the autocorrelation peak.

A detailed analysis of the signal m(t) makes it possible to see that in the case where the two sequences used for modulating the data are orthogonal, the signal m(t) has a zero mean value outside the correlation peak. Thus, in this case, the output of the integrator 26 does not have a shift as was the case with the conventional structure.

Case No. 2: $b_0 = b_{-1} = -1$

In this case, we obtain $d_0 = d_{-1} = -d_{-2}$. Thus, it is possible to rewrite $x_{FR1}$ and $x_{F2}$ in the following form, with the same simplifying notations as hereinbefore:

$$x_{FR1} = -d_{-1}\{\hat{\Theta}_{11} + \hat{\Theta}_{21}\}$$

$$x_{F2} = -d_{-1}\{\hat{\Theta}_{12} + \hat{\Theta}_{22}\}$$

so that $m(t) = \hat{\Theta}_{11}\cdot\hat{\Theta}_{12} + \hat{\Theta}_{11}\cdot\hat{\Theta}_{22} + \hat{\Theta}_{21}\cdot\hat{\Theta}_{12} + \hat{\Theta}_{21}\cdot\hat{\Theta}_{22}$ All the remarks made in connection with case No. 1 still apply.

Case No. 3: $b_0 = 1$ $b_{-1} = -1$

In this case, we obtain $d_0 = d_{-1} = -d_{-2}$ and therefore $$x_{FR1} = d_{-1}\{\hat{\Theta}_{11} + \hat{\Theta}_{21}\}$$

$$x_{F2} = d_{-1}\{\hat{\Theta}_{12} + \hat{\Theta}_{22}\}$$

and $m(t) = \hat{\Theta}_{11}\cdot\hat{\Theta}_{12} + \hat{\Theta}_{21}\cdot\hat{\Theta}_{12} + \hat{\Theta}_{11}\cdot\hat{\Theta}_{22} + \hat{\Theta}_{21}\cdot\hat{\Theta}_{22}$ The same remarks still apply.

Case No. 4: $b_0 = -1$ $b_{-1} = 1$

In this last case, we have $d_0 = -d_{-1} = -d_{-2}$ and $$x_{FR1} = d_{-1}\{\Theta_{11} + \Theta_{21}\}$$

$$x_{F2} = -d_{-1}\{\Theta_{12} + \Theta_{22}\}$$

so that $m(t) = -\hat{\Theta}_{11}\hat{\Theta}_{12} - \hat{\Theta}_{11}\hat{\Theta}_{22} - \hat{\Theta}_{21}\hat{\Theta}_{12} - \hat{\Theta}_{21}\hat{\Theta}_{22}$ The same remarks still apply.

The two signals received by the demodulator 24 are different both as respect to their serial position and by the pseudorandom sequence involved. The signal $x_{FR1}$ has been delayed by a period $T_b$ and therefore corresponds, on transmission, to a symbol of serial position k−1, whereas the signal $x_{F2}$ corresponds to the following symbol of serial position k. In addition, the signal $x_{FR1}$ comes from a symbol which has been spread and then despread by the first sequence $C_{E1}$, whereas the signal $x_{F2}$ has been processed by the second sequence $C_{E2}$. As a result of the delay of one serial position between the symbols in question, it can be seen that the sequences $C_{E1}$ and $C_{E2}$ have not been transmitted at the same time. Each sequence is periodically transmitted with the same period $T_b$ as the symbols to be processed, but the sequence $C_{E1}$ linked wit the signal $x_{FR1}$ has been transmitted one serial position prior to the sequence $C_{E2}$ linked with the signal $x_{F2}$. The two sequences $C_{E1}$ and $C_{E2}$, although globally produced simultaneously by the generators $30_1$ and $30_2$, intervene in a manner shifted by one serial position as a result of the processing performed on reception of the sequences. Thus, use is then made of a sequence $C_{E1}$ and then a sequence $C_{E2}$.

Figure 7:
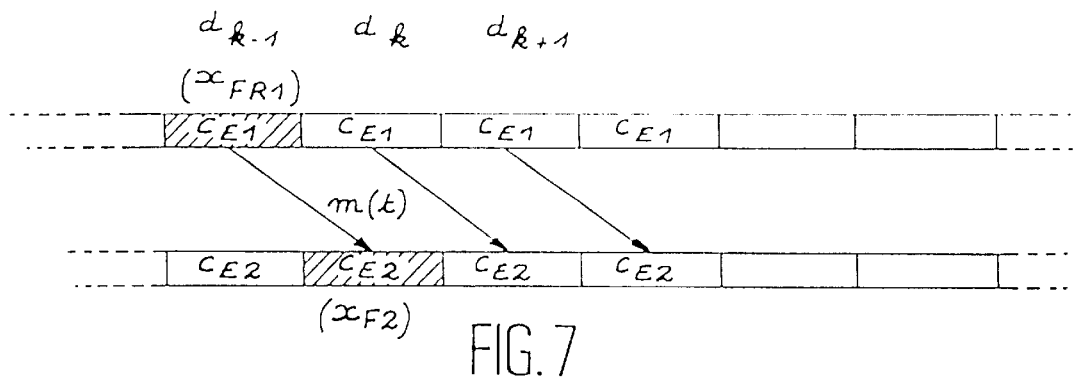
FIG. 7 symbolically shows the transmission principle of a single data flow.

This process is diagrammatically illustrated in FIG. 7. The first sequence $C_{E1}$ is repeated periodically for each symbol $d_{k-1}$, $d_k$, $d_{k+1}$, etc., as is the second sequence $C_{E2}$. These sequences are symbolized by the rectangles of respectively the upper and lower bands. On reception, the demodulation signal m(t) is formed from a signal $x_{FR1}$, whose origin is a symbol of serial position k−1 processed by $C_{E1}$ and a signal $x_{F1}$ originating from a symbol of serial position k processed by $C_{E2}$. The downward oblique arrow from a sequence $C_{E1}$ of serial position k−1 to a sequence $C_{E2}$ of serial position k symbolizes the chronology of the sequences used. This chronology is repeated on each formation of a new demodulation signal. All the downward oblique arrows symbolize the transmission of all the symbols $d_k$, when k increases unitwise.

In the embodiment illustrated in FIGS. 5 and 6, this distinction between the serial position of the sequences involved has no importance because a sequence is identically repeated (the sequence $C_{E1}$ of serial position k−1 being identical to the sequence $C_{E1}$ of serial position k). However, the distinctions described hereinbefore give a better understanding of the improvement provided by the invention and which is as follows.

It is possible to conceive a receiver using a first matched filter on $C_{E1}$ and which would not be followed by a delay circuit, the latter being associated with the second filter matched to $C_{E2}$. Demodulation would then take place of the phase jumps caused by $C_{E2}$ followed by $C_{E1}$.

In other words, it is possible to exploit the presence of two pseudorandom sequences on transmission by simultaneously transmitting two data flows and by detecting the phase jumps in both directions. This is what is symbolically shown in FIG. 8, where at the top there is a succession of pseudorandom sequences $C_{E1}$ and at the bottom a successive of pseudorandom sequences $C_{E2}$. Data $b_1$ impose phase jumps between a sequence $C_{E1}$ and the following sequence $C_{E2}$. Data $b_2$ impose phase jumps between a sequence $C_{E2}$ and the following sequence $C_{E1}$. The rising or falling oblique arrows symbolize the two processes.

Figure 9:
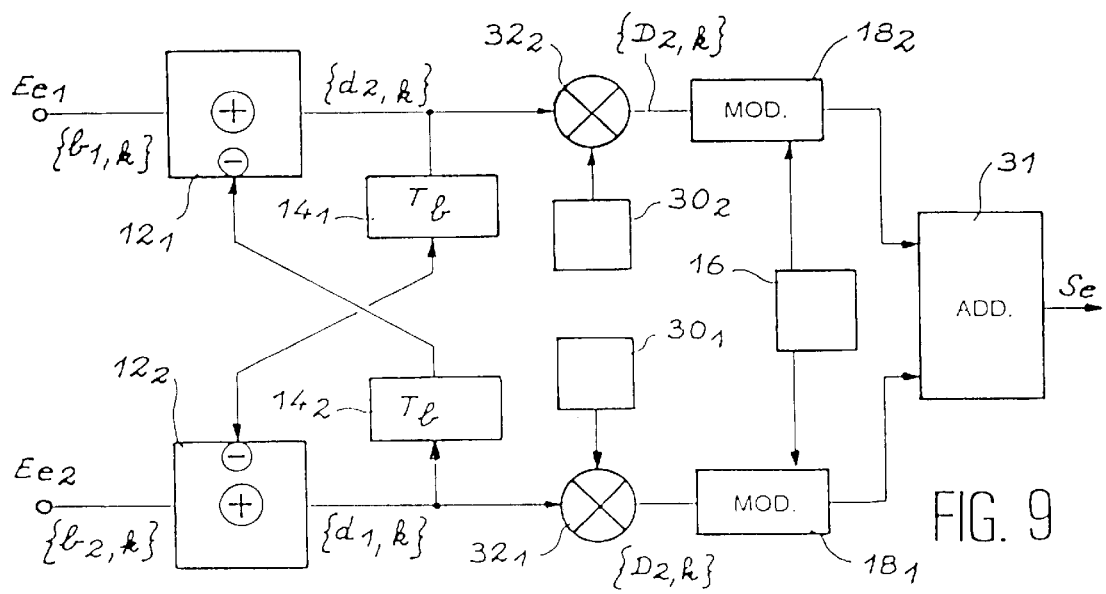
FIG. 9 shows the structure of a transmitter corresponding to a double data transmission.
Figure 10:
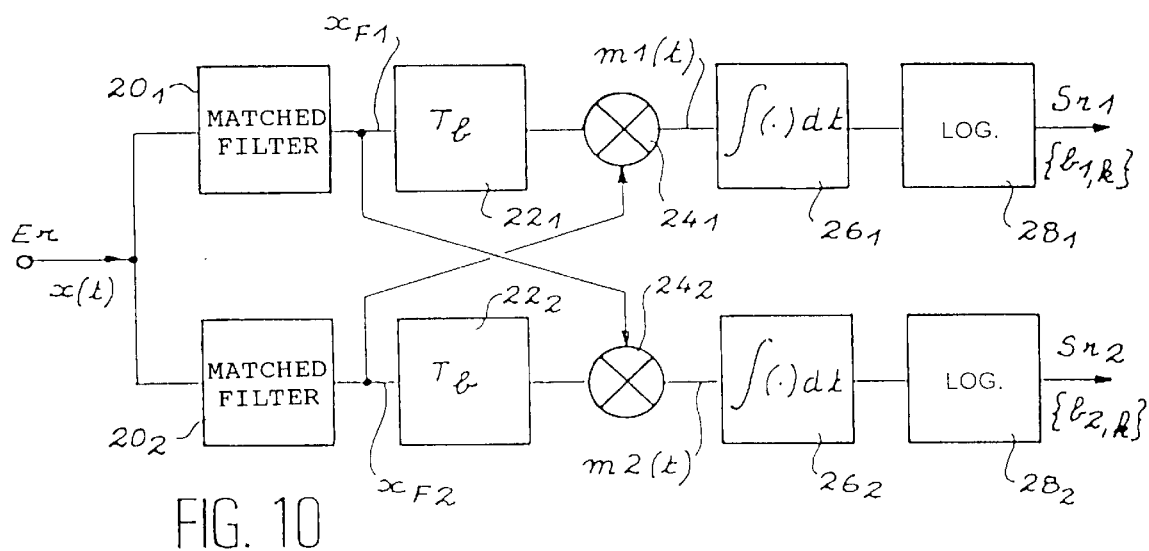
FIG. 10 shows the structure of the corresponding receiver.

FIGS. 9 and 10 illustrate how it is necessary to modify the diagrams of the transmitter and receiver compared with FIGS. 5 and 6 in order to effect this double transmission. The transmitter of FIG. 9 has two inputs $Ee_1$, $Ee_2$ receiving two binary data flows respectively $b_{1,k}$ and $b_{2,k}$. It comprises two logic circuits $12_1$, $12_2$ and two delay circuits $14_1$, $14_2$, whose input is connected to the output of one of the logic circuits and the output is connected to the input of the other logic circuit. A first multiplier $32_1$ processes the symbols $d_{1,k}$ present at the output of the logic circuit $12_2$ and a second multiplier $32_2$ the symbols $d_{2,k}$ present at the output of the logic circuit $12_1$. There is a local oscillator 16 supplying the carrier, two modulators $18_1$, $18_2$ and an adder 31 supplying at its output Se the doubly modulated carrier.

On the receiver side and as is illustrated in FIG. 10, there are two symmetrical channels crossed at the outset, a first channel with a filter $20_1$ matched to the sequence $C_{E1}$ and a delay circuit $22_1$ and a second channel with a second filter $20_2$ matched to the sequence $C_{E2}$ and a delay circuit $22_2$. Thus, the first channel comprises a multiplier $24_1$, an integrator $26_1$ and a decision logic $28_1$. The second channel comprises a multiplier $24_2$, an integrator $26_2$ and a decision logic $28_2$. The multiplier circuits $24_1$, $24_2$ receive in the first case the filtered, delayed signal $x_{FR1}$ individual to the sequence $C_{E1}$ and the filtered signal $x_{F2}$ individual to the sequence $C_{E2}$ and for the second the filtered, delayed signal $X_{FR2}$ individual to the sequence $C_{E2}$ and the filtered signal $x_{F1}$ individual to the sequence $C_{E1}$. These circuits $24_1$, $24_2$ supply demodulation signals $m_1(t)$ and $m_2(t)$, which, as for the simple variant of FIGS. 5 and 6, are at a zero mean value outside t=0. The integrators $26_1$, $26_2$ integrate these signals, as for FIG. 6, and two logic decision circuits $28_1$, $28_2$ restore on two outputs $Sr_1$, $Sr_2$, the two data flows $b_{1,k}$ and $b_{2,k}$.

This transmitter-receiver assembly functions as follows. The symbols $d_{1,k}$ are the result of the logic combination by exclusive-OR of $b_{2,k}$ and the compliment of $d_{2,k-1}$. In the same way, the symbols $d_{2,k}$ are the result of the logic combination of $b_{1,k}$ and the compliment of $d_{1,k-1}$ and it is therefore possible to write:

$$d_{1,k} = b_{2,k} \oplus \overline{d_{2,k-1}}$$

$$d_{2,k} = b_{1,k} \oplus \overline{d_{1,k-1}}$$

The first pseudorandom sequence $C_{E1}$ affects the symbols $d_{1,k}$, whereas the second pseudorandom sequence $C_{E2}$ affects the symbols $d_{2,k}$. These sequences spread the spectrum of the symbols and new spread spectrum symbols $D_{1,k}$ and $D_{2,k}$ are obtained.

In the receiver, the filter $20_1$ of the upper channel, which is matched to $C_{E1}$, supplies a filtered signal $x_{F1}$, which will depend on the symbol $d_{2,k}$ affected by $C_{E1}$, whereas the filter $20_2$ of the lower channel, which is matched to $C_{E2}$ supplies a signal $x_{F2}$, which will depend on the symbol $d_{2,k}$, which has been affected by $C_{E2}$. However, the delay circuit $22_2$ delays the filtered signal $x_{F2}$ in such a way that the filtered, delayed signal $x_{FR2}$ is dependent on the preceding symbol, i.e. $d_{2,k-1}$, which has been affected by $C_{E2}$. The demodulation performed by the circuit $24_2$ therefore has an effect on a transition of $C_{E2}$ to $C_{E1}$, which corresponds to the binary data item $b_2$ of the second data flow and in FIG. 8 to one of the rising oblique arrows.

The same reasoning, but symmetrically, shows that the upper channel of the demodulator processes the transitions of $C_{E1}$ to $C_{E2}$ and therefore the data $b_1$.

Figure 11:
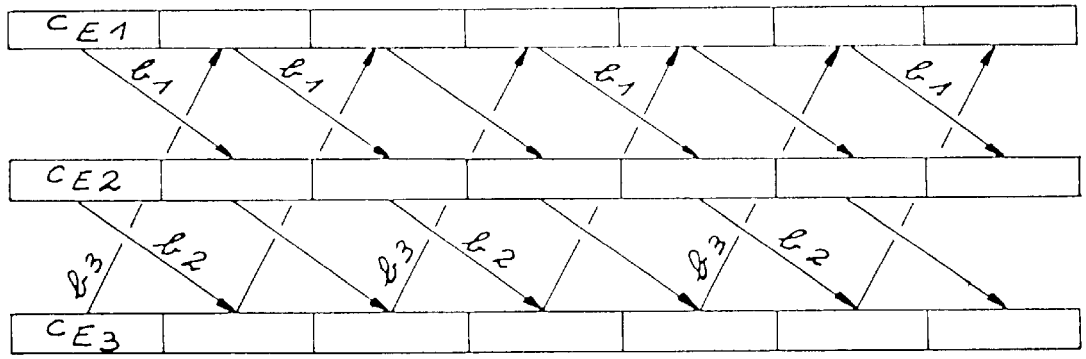
FIG. 11 symbolically illustrates a transmission of three data flows with three pairwise orthogonal pseudorandom sequences.

The preceding description relates to the transmission of two symbols and the use of two orthogonal pseudorandom sequences. It is perfectly possible to extend this principle to n symbols and n sequences, where n is an integer higher than 2. In this case, it is e.g. possible to use a transmission, whose modulation is based on the principle of FIG. 11 (compare with FIG. 8) for 3 symbols and 3 sequences.

In this case, the symbol $b_1$ modulates the phase jumps between a sequence $C_{E1}$ and the following sequence $C_{E2}$. The symbol $b_2$ modulates the phase jumps between a sequence $C_{E2}$ and the following sequence $C_{E3}$. The symbol $b_3$ modulates the phase jumps between a sequence $C_{E3}$ and the following sequence $C_{E1}$.

All the advantages described hereinbefore are retained. It is merely necessary for this purpose that the n sequences used are pairwise orthogonal.

Figure 8:
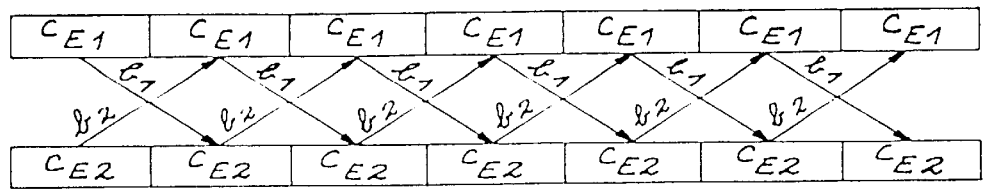
FIG. 8 symbolically shows the principle of simultaneously transmitting two data flows.
Figure 12:
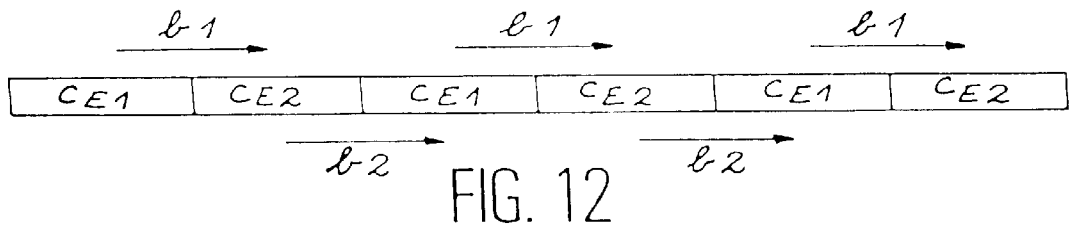
FIG. 12 illustrates a transmission variant of two symbols with the half flow rates.

Another embodiment of the principle is illustrated in FIG. 12 and makes it possible to transit, as in the case of FIG. 8, two symbols, but with twice lower rates and still using two orthogonal pseudorandom sequences. In this case, the two sequences are alternately transmitted and the symbol $b_1$ modulates the phase jumps between a sequence $C_{E1}$ and the following sequence $C_{E2}$, whereas the symbol $b_2$ modulates the phase jumps between a sequence $C_{E2}$ and the following sequence $C_{E1}$. The advantage is that due to the fact that at a given instant a single sequence is transmitted instead of two, i.e. all the transmission power is used for this sequence, which leads to an improvement in the quality of the signal received. However, the disadvantage is the reduction of the symbol rate.

The construction of the corresponding transmitter is slightly simplified compared with that described relative to FIG. 9, a single modulator being sufficient, there is no adder and the switching of the sequences can be very easily digitally performed. However, the receiver has a structure strictly identical to that described relative to FIG. 10.

Such a process for the transmission of several bits with the aid of several pseudorandom sequences offers the following advantages compared with conventional processes:

a better resistance to scramblers and interference in the wide and narrow bands, taking account of the passage in the two filters having orthogonal pulse responses prior to demodulation, a reduction of the parasitic noise outside the correlation peaks (in mean, effective value).

All the preceding description has related to the transmission of binary symbols, i.e. a two-state phase modulation. However, the invention is not limited to this case and is applicable to phase modulations with a larger number of states. The most frequently encountered conventional constructions use DQPSK modulation with four phase states permitting the transmission of two bit symbols. The present invention applies to said DQPSK modulation. As the phase jumps can assume four possible values they are jumps between two orthogonal sequences instead of being on the same sequence, as in the conventional case.

The pseudorandom sequences used for spreading the spectrum are not necessarily binary sequences. The invention can be implemented with sequences having a larger number of states, e.g. quaternary sequences, or even more complex pseudorandom signals.

A particularly interesting case consists of using as a pair of orthogonal pseudorandom sequences, two reciprocal sequences (one being the time inverse of the other). Starting from a sequence in C(t), a reciprocal sequence is obtained by transforming t into $T_b-t$. The use of reciprocal sequences is e.g. described in WO 92/02997.

Figure 13:
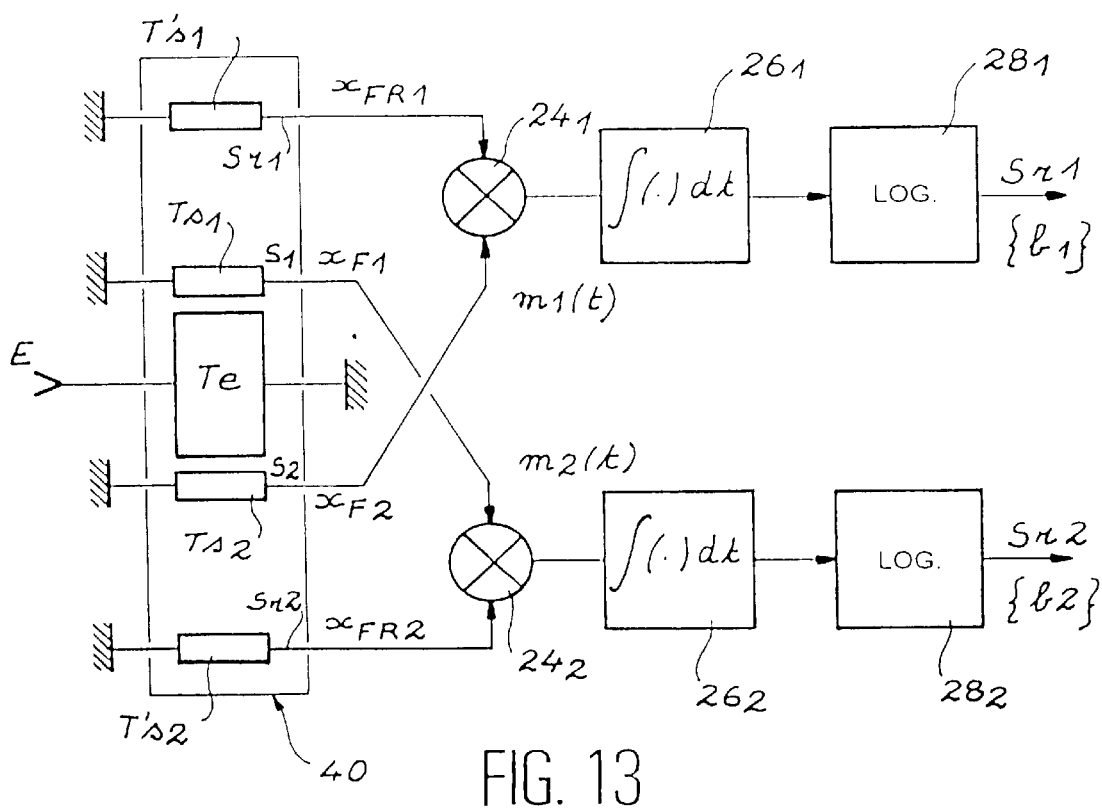
FIG. 13 illustrates an embodiment of a receiver having a surface acoustic wave component.

This use of two reciprocal sequences make it possible to construct a receiver using a surface acoustic wave component simultaneously performing the matched and delayed filtering operations. A receiver using such a component is described in FIG. 13.

The component 40 has an input transducer Te and four output transducers $T_{s1}$, $T'_{s1}$, $T_{s2}$, $T'_{s2}$, constituted by aluminium electrodes deposited on a piezoelectric, e.g. quartz substrate. These four transducers are connected to four outputs $S_1$, $S_{r1}$, $S_2$, $S_{r2}$.

The four output transducers have an identical pulse response of very short duration, equal to or below the duration of one element of the pseudorandom sequences. The global pulse response of the component is, under these conditions, imposed by the geometry of the input transducer. The latter comprises N elementary electrodes in split-finger transducer form, which are interconnected in such a way that the pulse response of the filter between the input E and an output $S_1$ is equal to the time-reverse combined complex of the first sequence $C_{E1}$. Obviously, if the two output transducers $T_{s1}$ and $T_{s2}$ are arranged symmetrically on either side of the input transducer Te, the pulse responses of the thus formed two filters will be reciprocal of one another.

In the same way, by placing two remote transducers $T'_{s1}$ and $T'_{s2}$ on the substrate, in such a way that the distance between $T_{s1}$ and $T_{s2}$ or between $T'_{s1}$ and $T'_{s2}$ is such that the time taken by the acoustic RAYLEIGH wave to cover the interval separating the transducers is equal to $T_b$, two delay lines of duration $T_b$ will be obtained on the same component. Thus, this single component 40 can be used in a spectrum spread differential receiver using alternating reciprocal sequences.

It is obviously possible to use two distinct components, each having an input transducer matched to one of the two orthogonal sequences and two output transducers making it possible to obtain filtered signals and filtered, delayed signals.

I claim:

1. Process for data transmission by spread-spectrum, comprising the steps of:

A) on transmission:
  organizing said data in at least one binary data sequence ($b_K$), the data having a given period (Tb),
  coding said data by differential coding to obtain symbols ($d_K$),
  producing two orthogonal pseudorandom sequences ($C_{E1}$, $C_{E2}$), each sequence comprising chips having a duration (Tc), the period ($T_b$) of said data being N times higher than the duration (Tc) of said chips,
  multiplying said symbols ($d_K$) by said two orthogonal pseudorandom sequences ($C_{E1}$, $C_{E2}$), so as to obtain two spread symbols $(D_K)_1$, $(D_K)_2$,
  generating a carrier,
  modulating said carrier by said two spread symbols $(D_K)_1$, $(D_K)_2$,
  transmitting the modulated carrier,
B) on reception:
  receiving the modulated carrier (x(t)), performing two parallel filtering operations on the received modulated carrier, said filtering operations being respectively matched to said two orthogonal sequences ($C_{E1}$, $C_{E2}$), said filtering producing two filtered signals ($X_{F1}$ n $X_{F2}$),
  delaying one of said two filtered signals ($X_F$) by said period ($T_b$) of said data and leaving the other undelayed,
  estimating the phase difference between said delayed signal and said undelayed signal,
  restoring said data ($b_K$) from said phase difference.

2. Process according to claim 1, wherein said data to be transmitted are organized in a single binary data sequence ($b_K$), said process comprising the steps of:
  A) on transmission:
    producing a first pseudorandom sequence ($C_{E1}$),
    multiplying said symbols ($d_K$) by said first pseudorandom sequence ($C_{E1}$) in order to obtain first spread spectrum symbols $(D_K)_1$,
    producing a second pseudorandom sequence ($C_{E2}$) orthogonal to the first ($C_{E1}$),
    multiplying said symbols ($d_K$) by said second pseudorandom sequence ($C_{E2}$) in order to obtain second spread spectrum symbols $(D_K)_2$,
    modulating the carrier (P) by said first spread spectrum symbols $(D_K)_1$ and by said second spread spectrum symbols $(D_K)_2$,
  B) on reception:
    receiving the modulated carrier (x(t)),
    performing a first filtering of the signal received (x(t)) by a first matched filter (20$_1$) having a pulse response which is the time inverse of the first pseudorandom sequence used on transmission ($C_{E1}$), this first filtering producing filtered signal ($X_{F1}$),
    performing a second filtering of the signal received (x(t)) by a second matched filter (20$_2$) having a pulse response which is the time inverse of the second pseudorandom sequence used on transmission ($C_{E2}$), this second filtering producing a second filtered signal ($X_{F2}$),
    delaying one of the filtered signals by one period ($T_b$) to obtain a filtered delayed signal ($X_{FR}$), and leaving the other filtered signal undelayed,
    multiplying said filtered delayed signal ($X_{FR}$) by said filtered undelayed signal ($X_{F1}$) to obtain a demodulation signal (m(t)),
    restoring the transmitted data from said demodulation signal.

3. Process according to claim 1, wherein said data to be transmitted are organized in at least two separate sequences of binary data ($b_{1,K}$) ($b_{2,K}$), of the same period ($T_b$), said process comprising the steps of:
  A) on transmission:
    forming a first and a second sequences of symbols ($d_{1,K}$) ($d_{2,K}$) from said two binary data sequences ($b_{1,K}$) ($b_{2,K}$), one symbol of a sequence ($d_{2,K}$) ($d_{1,K}$) being obtained by a logic combination between a data item ($b_{1,K}$) ($b_{2,K}$), and a symbol of the other sequence delayed by a period equal to the period ($T_b$) ($d_{1,K-1}$, $d_{2,K-1}$),
    producing a first pseudorandom sequence ($C_{E1}$),
    multiplying the symbols of said first sequence ($d_{1,K}$) by said first pseudorandom sequence ($C_{E1}$) to obtain a first sequence of spread spectrum symbols ($D_{1,K}$),
    producing a second pseudorandom sequence ($C_{E2}$), orthogonal to the first sequence ($C_{E1}$),
    multiplying said symbols of the second sequence ($d_{2,K}$) by said second pseudorandom sequence ($C_{E2}$) to obtain a second sequence of spread spectrum symbols $(D_K)_2$,
    modulating the carrier (P) on the one hand by the first sequence of spread spectrum symbols ($D_{1,K}$) and on the other by the second sequence of spread spectrum symbols ($D_{2,K}$),
    summing the two modulated parts of the carrier,
    transmitting the carrier thus obtained,
  B) on reception:
    receiving the modulated carrier (x(t)),
    performing a first filtering of said received signal (x(t)) by a first matched filter having a pulse response which is the time inverse of the first pseudorandom sequence used on transmission ($C_{E1}$), thus obtaining a first filtered signal ($X_{F1}$),
    performing a second filtering of said received signal (x(t)) by a second matched filter having a pulse response which is the time inverse of the second pseudorandom sequence used on transmission ($C_{E2}$) thus obtaining a second filtered signal ($X_{F2}$),
    delaying said first filtered signal ($X_{F1}$) by a period ($T_b$) of the binary data ($b_{1,K}$) ($b_{2,K}$) and thus obtaining a first filtered delayed signal ($X_{FR1}$),
    delaying said second filtered signal ($X_{F2}$) by a period equal to the period ($T_b$) of the binary data ($b_{1,K}$) ($b_{2,K}$) and thus obtaining a second filtered delayed signal ($X_{FR2}$),
    multiplying said first filtered delayed signal ($X_{FR1}$) by said second filtered signal ($X_{F2}$) to obtain a first demodulation signal ($m_1(t)$),
    multiplying said second filtered delayed signal ($X_{FR2}$) by said first filtered signal ($X_{F1}$) to obtain a second demodulation signal ($m_2(t)$),
    integrating said first demodulation signal ($m_1(t)$) for a duration equal to the period ($T_b$) of the binary data ($b_{1,K}$) ($b_{2,K}$),
    integrating said second demodulation signal ($m_2(t)$) for a duration equal to the period ($T_b$) of the binary data ($b_{1,K}$) ($b_{2,K}$),
    evaluating the sign of the signal resulting from the integration of the first signal and restoring the binary data of the first sequence ($b_{1,K}$),
    evaluating the sign of the signal resulting from the integration of the second signal and restoring the binary data of the first sequence ($b_{2,K}$).

4. Process according to claim 3, wherein alternate transmission takes place of the two orthogonal sequences, a first symbol ($b_1$) modulating the phase jumps between a first sequence ($C_{E1}$) and a second, following sequence ($C_{E2}$), whereas a second symbol ($b_2$) modulates the phase jumps between the second sequence ($C_{E2}$) and the first sequence ($C_{E1}$).

5. Process according to claim 3, wherein the binary data are organized in a number n of sequences, n being an integer higher than 2, n pairwise orthogonal pseudorandom sequences are produced and the data of the two sequences are transmitted with the aid of two of the orthogonal pseudorandom sequences.

6. Process according to claim 1, wherein said symbols ($d_k$) are one bit.

7. Process according to claim 1, wherein said symbols ($d_k$) are two bits.

8. Process according to claim 1, wherein said first and second pseudorandom sequences ($C_{E1}$, $C_{E2}$) are binary sequences.

9. Process according to claim 1, wherein said first and second pseudorandom sequences ($C_{E1}$, $C_{E2}$) are quaternary sequences.

10. Process according to claim 1, wherein said two orthogonal pseudorandom sequences ($C_{E1}$, $C_{E2}$) are reciprocal sequences.

* * * * *

UNITED STATES PATENT AND TRADEMARK OFFICE
CERTIFICATE OF CORRECTION

PATENT NO. : 5,822,363
DATED : October 13, 1998
INVENTOR(S) : Le Roy

It is certified that error appears in the above-identified patent and that said Letters Patent is hereby corrected as shown below:

On the Title Page, Item [54], Line 3, delete "ADN" and insert --AND--.

Column 1, Line 3, delete "ADN" and insert --AND--.

Column 2, Line 36, delete "SRC4" and insert --$SRC_4$--.

Column 4, Line 28, delete "FIG. 4. The line (a)" and insert --FIGS. 4a, 4b and 4c. FIG. 4a--.

Column 4, Lines 28-29, delete "the line (b)" and insert --FIG. 4b represents--.

Column 4, Line 29, delete "the line (c)" and insert --FIG. 4c represents--.

Column 5, Line 52, first line of the Table, delete "$C_E$" (2nd occurrence) and insert --$C_{C_E}$--.

UNITED STATES PATENT AND TRADEMARK OFFICE
CERTIFICATE OF CORRECTION

PATENT NO. : 5,822,363
DATED : October 13, 1998
INVENTOR(S) : Le Roy

It is certified that error appears in the above-identified patent and that said Letters Patent is hereby corrected as shown below:

Column 7, Line 5, delete "4" and insert --4a--.

Column 7, Lines 5-7, delete "shows the configuration of the different signals appearing in a direct sequence spectrum spread receiver." and insert --represents the filtered signal $x_F(t)$.

FIG. 4b, already described, represents the correlation signal $x_F(t)*x_F(T_s-t)$.

FIG. 4c, already described, represents the signal at the integration output.--.

Signed and Sealed this

Fourth Day of May, 1999

Attest:

Q. TODD DICKINSON

Attesting Officer

Acting Commissioner of Patents and Trademarks